(12) United States Patent
Lebber et al.

(10) Patent No.: US 9,787,915 B2
(45) Date of Patent: Oct. 10, 2017

(54) METHOD AND APPARATUS FOR MULTI-SPECTRAL IMAGING

(75) Inventors: Ramy Lebber, Manof (IL); Ephraim Pinsky, Kiriyat Tivon (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 267 days.

(21) Appl. No.: 13/995,963

(22) PCT Filed: Dec. 29, 2011

(86) PCT No.: PCT/IB2011/056013
§ 371 (c)(1),
(2), (4) Date: Jun. 20, 2013

(87) PCT Pub. No.: WO2012/093325
PCT Pub. Date: Jul. 12, 2012

(65) Prior Publication Data
US 2013/0300876 A1 Nov. 14, 2013

(30) Foreign Application Priority Data
Jan. 5, 2011 (IL) .......................................... 210461

(51) Int. Cl.
*H04N 5/33* (2006.01)
*H04N 5/235* (2006.01)
*H04N 9/04* (2006.01)

(52) U.S. Cl.
CPC ........... *H04N 5/332* (2013.01); *H04N 5/2353* (2013.01); *H04N 9/045* (2013.01)

(58) Field of Classification Search
CPC ...................................................... H04N 5/332
USPC ........................................................ 348/164
See application file for complete search history.

(56) References Cited

U.S. PATENT DOCUMENTS

| 3,971,065 | A | | 7/1976 | Bayer |
| 4,566,029 | A | | 1/1986 | Johnson |
| 5,414,465 | A | | 5/1995 | Kodama et al. |
| 5,436,661 | A | | 7/1995 | Yamamoto et al. |
| 5,732,146 | A | * | 3/1998 | Yamada ............ G06K 9/00711 348/14.15 |
| 5,900,942 | A | | 5/1999 | Spiering |

(Continued)

FOREIGN PATENT DOCUMENTS

WO 2009/093110 7/2009
WO 2010041375 4/2010

*Primary Examiner* — Gims Philippe
*Assistant Examiner* — Amir Shahnami
(74) *Attorney, Agent, or Firm* — Mark M. Friedman (57) ABSTRACT

A system and method for sampling multi-spectral images of a dynamically changing scene facilitates independently dynamically adjusting the exposure of a photosensor based on a first group of sequences of images, while disregarding a second group of sequences of images, where each sequence of images is of a distinct color of light. In addition, the current description presents an innovative technique for constructing a multi-spectral image of a scene based on individually contrast-enhanced images of the scene. Applications include video photography and high quality true color stills camera with separate sensor arrays for each color channel. The control of the present embodiment can be used to produce photographs with truer color than conventional techniques.

20 Claims, 4 Drawing Sheets

(56) References Cited

U.S. PATENT DOCUMENTS

| | | | | |
|---|---|---|---|---|
| 6,147,705 A | * | 11/2000 | Krauter | H04N 9/735 |
| | | | | 348/224.1 |
| 6,215,597 B1 | | 4/2001 | Duncan et al. | |
| 6,611,289 B1 | | 8/2003 | Yu et al. | |
| 7,671,907 B2 | | 3/2010 | Kobayashi et al. | |
| 2002/0018129 A1 | | 2/2002 | Ikeda | |
| 2004/0239790 A1 | | 12/2004 | Maeda et al. | |
| 2004/0240546 A1 | | 12/2004 | Wells | |
| 2005/0192094 A1 | * | 9/2005 | Okada | A63F 13/00 |
| | | | | 463/34 |
| 2005/0213221 A1 | | 9/2005 | Hoshuyama | |
| 2006/0227227 A1 | * | 10/2006 | Tsuruoka | H04N 9/045 |
| | | | | 348/241 |
| 2007/0145273 A1 | | 6/2007 | Chang | |
| 2007/0211155 A1 | | 9/2007 | Numata | |
| 2007/0216777 A1 | | 9/2007 | Quan | |
| 2007/0296825 A1 | | 12/2007 | Ito | |
| 2008/0012955 A1 | | 1/2008 | Johnson | |
| 2008/0118183 A1 | | 5/2008 | Teo | |
| 2009/0091645 A1 | * | 4/2009 | Trimeche | H04N 5/235 |
| | | | | 348/273 |
| 2011/0058038 A1 | * | 3/2011 | Twede | H04N 5/332 |
| | | | | 348/148 |
| 2011/0169984 A1 | | 7/2011 | Noguchi | |
| 2011/0205397 A1 | * | 8/2011 | Hahn | G06F 3/147 |
| | | | | 348/231.6 |

* cited by examiner

METHOD AND APPARATUS FOR MULTI-SPECTRAL IMAGING

FIELD OF THE INVENTION

The present embodiment generally relates to image sampling devices, and in particular, it concerns a system and method for sampling multi-spectral images of a dynamically changing scene.

BACKGROUND OF THE INVENTION

Multi-spectral imaging is important in a variety of applications, including astronomical research, agriculture, archeology, geology, quality control, and surveillance, as well as various medical and military applications. In the context of this document, multi-spectral imaging refers to any imaging technique that simultaneously samples two-dimensional images in, at least, two distinct predefined spectral ranges. In the field spectral ranges are commonly referred to as colors, and may be of any spectral width, may be overlapping or nested, and may lie anywhere in the optical radiation band ranging from infrared (IR) through visible (VIS) to ultraviolet (UV). Near infra-red (NIR) refers to the non-visible part of the electromagnetic spectrum with wavelengths just longer than those of visible red light. In the context of this document, light generally refers to the optical radiation band, and includes the visible spectral range (VIS) and non-visible spectral ranges (IR and UV). Examples of multi-spectral imaging according to this definition include, but are not limited to true-color video imaging, green-red-infrared imaging, and imaging techniques using multiple infrared wavelengths.

Techniques for multi-spectral imaging to capture digital images are known in the art. A popular example is color photography, in which red, green, and blue ("RGB") color separations are recorded for each image and are recombined to generate a "true color" representation of the scene. Where a series of images is captured, each image is also referred to as a frame. Multi-spectral imaging devices are readily available, including still cameras and video cameras, to capture multi-spectral images of a scene. In the context of this document, a scene is an area or location of interest of which images are being captured. A dynamically changing scene includes a single area of interest in which the contents are changing, moving an imaging device to capture images of a plurality of areas of interest, and a combination of changing content and moving the imaging device.

Multi-spectral imaging that includes spectral ranges outside of the visible spectrum, typically either infrared or ultraviolet regions, allows extraction of additional information from a scene that is not visible to the human eye. For example, where different parts of a scene have similar reflectivity in the visible range but exhibit different reflectivities at IR wavelengths. Depending on the intended application, multi-spectral imaging may have any number of distinct channels from two upwards. Multi-spectral imaging typically refers to no more than dozens of distinct channels, and a larger number of channels are commonly referred to as hyper-spectral imaging.

For display to a human user, the information from various non-visible spectral ranges is commonly mapped into visible colors, producing what is referred to as a "false color" or "synthetic color" image. In the case where a multi-spectral image includes colors from the non-visible spectral range, the multi-spectral image is referred to as a synthetic color image.

A color filter array (CFA), or color filter mosaic (CFM), is a mosaic of color filters placed over the pixel sensors of an image sensor to capture color information. Color filters are needed because typical photosensors detect light intensity with little or no wavelength specificity, and therefore cannot separate color information. The color filters filter the light by spectral range, such that the separate filtered intensities include information about the color corresponding to the filter. The spectral range of a photosensor is commonly referred to as the color, or colors, provided by the photosensor. A combination of color filter mosaic and photosensor is referred to as a mosaic color photosensor. A popular color filter mosaic is the Bayer filter, which gives information about the intensity of light in red, green, and blue (RGB) spectral regions. U.S. Pat. No. 3,971,065 to Bryce E. Bayer for Color Imaging Array teaches a CFA for arranging RGB color filters on a square grid of photosensors that is 50% green, 25% red, and 25% blue, also known as RGGB. A Bayer CFA used with a photosensor is known as a Bayer mosaic color photosensor. In the raw image data from a mosaic color photosensor, each pixel is filtered to record only one of the filter colors, hence the image data from each pixel cannot fully determine color. To obtain a full-color image, various demosaicing algorithms can be used to interpolate a set of complete color values for each pixel.

Additional background information can be found in US patent application 20070145273 to Edward T. Chang for High-Sensitivity Infrared Color Camera, which teaches a CFA including 2×2 blocks of pixels of one red, one blue, one green and one transparent pixel, in a configuration intended to include infrared sensitivity for higher overall sensitivity.

Multi-spectral imaging devices can include filters and mirrors to separate light into multiple colors. Multiple photosensors each capture one or more colors of the separated light. One type of filter that can be used is a dichroic filter. A dichroic filter, thin-film filter, or interference filter is a very accurate color filter used to selectively pass light of a specified range of colors while reflecting other colors. By comparison, dichroic mirrors and dichroic reflectors tend to be characterized by the color(s) of light reflected, rather than the color(s) passed.

U.S. Pat. No. 7,138,663 to Nikon Corporation for Color Separation Device of Solid-State Image Sensor, teaches placement of dichroic mirrors over a triplet of photoreceptors. Specific wavelengths of light are separated and passed to specific photoreceptors designated to record red, green, and blue wavelengths. This system emulates three-CCD imaging systems with a single array.

A digital image photosensor inherently has a limited dynamic range. If too much light reaches the photosensor, the pixels of the photosensor reach saturation and fail to provide further image data (information about the corresponding spectral range of the sensor for the scene being captured). If, on the other hand, too little light reaches the photosensor, no image data will be recorded, or the image data will be spread between a relatively low number of intensity levels, resulting in loss of information or poor quality of the image. The image data is normally kept within the dynamic range of the photosensor by appropriate adjustment of the duration of exposure and/or other parameters affecting the sensitivity of the photosensor. This adjustment may be performed optically, for example by a mechanical or electro-optical shutter deployed in the optical system, or electronically, for example by controlling the electrical signals to the image sensor array which define the integration time, also known as exposure time, of the pixel sensors. The adjustment is typically performed collectively for all of the colors or spectral ranges.

Depending on the application and specific circumstances of a scene, an exposure adjustment may result in non-optimal use of the dynamic range of a sensor for one or more colors when the exposure is adjusted for all colors to avoid over-exposure of a particular color. By way of example, when a color video camera is turned towards a scene such that significant part of the scene is a bright blue sky, the short exposure time necessitated to avoid saturation in the blue color channel may result in loss of important information visible in the red and green color separations.

There is therefore a need for methods and devices for sampling multi-spectral images of a dynamically changing scene, where the exposures of photosensors are independently dynamically adjusted.

SUMMARY

According to the teachings of the present embodiment there is provided, a method for sampling multi-spectral images of a dynamically changing scene, the method including the steps of: sampling the dynamically changing scene with a mosaic color photosensor, the mosaic color photosensor providing a plurality of sequences of images of the dynamically changing scene, wherein each of the plurality of sequences of images is a distinct predefined color; processing a first group of two or more images each provided from one of the plurality of sequences of images to optimize an exposure parameter for the first group, the exposure parameter determined by applying at least one exposure criterion to the first group while disregarding a second group of one or more images each from one of the plurality of sequences of images other than the sequences of images providing images for the first group; setting an effective exposure for the mosaic color photosensor, the effective exposure for the mosaic color photosensor being set in accordance with the exposure parameter; and generating a corresponding sequence of multi-spectral images from subsequent images from the first group.

In an optional embodiment, the mosaic color photosensor is a Bayer mosaic color photosensor.

In another optional embodiment, the first group includes images from a sequence of images having the distinct predefined color of green and images from a sequence of images having the distinct predefined color of red, and the second group includes images from a sequence of images having the distinct predefined color of blue.

In another optional embodiment, a near infrared (NIR) photosensor provides a sequence of NIR images of the dynamically changing scene. In another optional embodiment, a NIR image from the sequence of NIR images is processed to optimize an exposure parameter for the NIR image and an effective exposure for the NIR photosensor is set in accordance with the exposure parameter for the NIR image. In another optional embodiment, the corresponding sequence of multi-spectral images is generated with corresponding subsequent NIR images.

In another optional embodiment, respective contrast enhancement parameters are derived from each of one or more of the plurality of sequences of images in the first group, and one or more of the plurality of sequences of images is independently processed with the respective contrast enhancement parameter. In another optional embodiment, the contrast-enhanced images are used to generate a corresponding sequence of multi-spectral images.

In another optional embodiment, the exposure parameter is determined from exactly one image from each of one or more of the plurality of sequences of images in the first group. In another optional embodiment, the exposure parameter is determined from a plurality of images from each of one or more of the plurality of sequences of images in the first group.

According to the teachings of the present embodiment there is provided, a method for generating a multi-spectral image of a scene, the method including the steps of: Generating from a mosaic color photosensor a plurality of images of the scene, wherein each of the plurality of images is a distinct predefined color; processing one or more of the plurality of images to perform contrast enhancement correction on each of one or more of the plurality of images to generate contrast-enhanced images; and generating a multi-spectral image based on at least two images selected from the group consisting of: the contrast-enhanced images; and the plurality of images.

In an optional embodiment, the multi-spectral image is generated based on two or more contrast-enhanced images. In another optional embodiment, the multi-spectral image is generated based on the one or more contrast-enhanced images with one or more of the plurality of images. In another optional embodiment, a plurality of sequences of images is generated, and the processing is repeated on each of the plurality of sequences of images to generate a sequence of multi-spectral images.

According to the teachings of the present embodiment there is provided, a system for sampling multi-spectral images of a dynamically changing scene including: a mosaic color photosensor configured to provide a plurality of sequences of images of the dynamically changing scene, wherein each of the plurality of sequences of images is a distinct predefined color; and an optical arrangement for transferring light of the dynamically changing scene to the mosaic color photosensor; and a processing system including one or more processors configured to: process a first group of two or more images each provided from one of the plurality of sequences of images to optimize an exposure parameter for the first group, the exposure parameter determined by applying at least one exposure criterion to the first group while disregarding a second group of one or more images each from one of the plurality of sequences of images other than the sequences of images providing images for the first group; generate an effective exposure for the mosaic color photosensor based on the exposure parameter, the mosaic color photosensor responsive to the effective exposure, the mosaic color photosensor being set in accordance with the effective exposure; and generate a corresponding sequence of multi-spectral images from subsequent images from the first group.

In an optional embodiment, the mosaic color photosensor is a Bayer mosaic color photosensor.

In another optional embodiment, the first group includes images from a sequence of images having the distinct predefined color of green and images from a sequence of images having the distinct predefined color of red, and the second group includes images from a sequence of images having the distinct predefined color of blue.

In another optional embodiment, the system further includes a near infrared (NIR) photosensor providing a sequence of NIR images of the dynamically changing scene.

In another optional embodiment, the optical arrangement includes a system of dichroic filters configured to split the light of the dynamically changing scene into NIR light and visible light, and configured to provide the NIR light to the NIR photosensor and provide the visible light to the mosaic color photosensor. In another optional embodiment, the optical arrangement includes a system of one or more prisms configured to split the light of the dynamically changing scene into NIR light and visible light, and configured to provide the NIR light to said NIR photosensor and provide the visible light to the mosaic color photosensor. In another optional embodiment, a NIR image from the sequence of NIR images is processed to optimize an exposure parameter for the NIR image and an effective exposure for the NIR photosensor is set in accordance with the exposure parameter for the NIR image. In another optional embodiment, the corresponding sequence of multi-spectral images is generated with a subsequent NIR image.

In another optional embodiment, the processing system is further configured to derive respective contrast enhancement parameters from each of one or more of the plurality of sequences of images in the first group, and one or more of the plurality of sequences of images is independently processed with the respective contrast enhancement parameters to generate contrast-enhanced images.

In another optional embodiment, the processing system is further configured to use the contrast-enhanced images to generate a corresponding contrast-enhanced sequence of multi-spectral images.

In another optional embodiment, the system is further configured to output the corresponding contrast-enhanced sequence of multi-spectral images as a video sequence.

In another optional embodiment, the system is configured to be switchable between generating multi-spectral images and generating true color mode images.

According to the teachings of the present embodiment there is provided, a system for generating a multi-spectral image of a scene, the system including: a mosaic color photosensor providing a plurality of images of the scene, wherein each of the plurality of images is a distinct predefined color; and a processing system including one or more processors configured to: process one or more of the plurality of images to perform contrast enhancement correction on each of one or more of the plurality of images to generate contrast-enhanced images; and generate a multi-spectral image based on at least two images selected from the group consisting of: the contrast-enhanced images; and the plurality of images.

In an optional embodiment, the multi-spectral image is generated based on two or more contrast-enhanced images. In another optional embodiment, the multi-spectral image is generated based on the one or more contrast-enhanced images with one or more of the plurality of images. In another optional embodiment, the mosaic color photosensor is configured to generate a plurality of sequences of images, and the processing is repeated on each of the plurality of sequences of images to generate a sequence of multi-spectral images.

BRIEF DESCRIPTION OF FIGURES

The embodiment is herein described, by way of example only, with reference to the accompanying drawings, wherein.

DETAILED DESCRIPTION

The principles and operation of the system according to the present embodiment may be better understood with reference to the drawings and the accompanying description. The present embodiment is a system and method for sampling multi-spectral images of a dynamically changing scene. The system facilitates independently dynamically adjusting the exposure of a photosensor based on a first group of sequences of images, while disregarding a second group of sequences of images, where each sequence of images is of a distinct color of light. In addition, the current description presents an innovative technique for constructing a multi-spectral image of a scene based on individually contrast-enhanced images of the scene.

In the above-described example, when a conventional color video camera is turned towards a scene which is mostly a bright blue sky, the short exposure time necessitated to avoid saturation in the blue color channel may result in loss of important information visible in the red and green color separations. Using a method of the present embodiment, exposures of photosensors are independently dynamically adjusted for red and green color separations, allowing the blue exposure to go into saturation.

Figure 1:
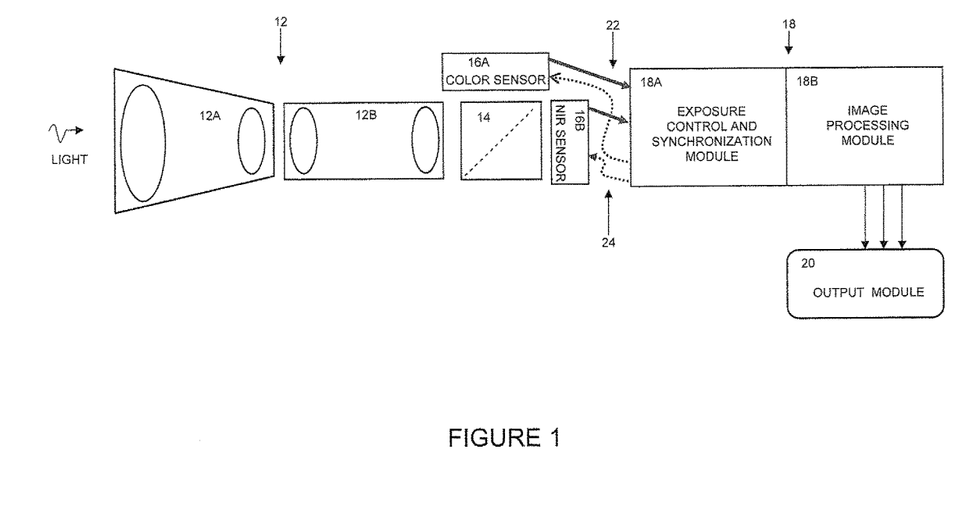
FIG. 1, a system for sampling multi-spectral images of a dynamically changing scene.

Referring now to the drawings, FIG. 1 is a system for sampling multi-spectral images of a dynamically changing scene, referred to as a multi-spectral imaging device. Optical arrangements (12, 14) transfer light (shown in FIG. 1 as LIGHT) of the dynamically changing scene to a mosaic color photosensor 16A and to a near infrared (NIR) photosensor 16B. Depending on the application, optical arrangement 12 can include a variety of components. Non-limiting examples of optical arrangement components include objective lens arrangement 12A and may also include an optical relay 12B. Optional and/or additional optical arrangements can be included in the multi-spectral imaging device, such as additional correcting optics between optical arrangement 14 and photosensors 16A and/or 16B. Optical arrangement 14 is configured to split the light of the dynamically changing scene into a plurality of colors.

Depending on the application, a variety of components can be used for splitting light into a plurality of colors. One or more colors are provided to photosensors for capturing images of the scene. One implementation is to use a system of dichroic filters to split the light of the dynamically changing scene into visible light (VIS) and NIR light. Visible light is provided to mosaic color photosensor 16A and NIR light is provided to NIR photosensor 16B.

Figure 2:
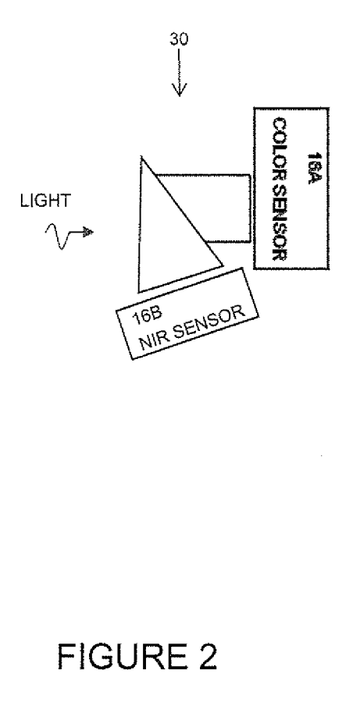
FIG. 2, a diagram of a 2CCD prism optical arrangement.

Referring to FIG. 2, a diagram of a 2CCD prism optical arrangement, an alternative implementation to optical arrangement 14 is to configure the system with one or more prisms 30 configured to split the light of the dynamically changing scene. Note that configuration 30 is an optional configuration that replaces configuration 14. Similar to the above description of FIG. 1, optional and/or additional optical arrangements can be included, such as additional correcting optics between optical arrangement 30 and photosensors 16A and/or 16B. 2CCD prism cameras for color/NIR are commercially available, and depending on the application, can be used as a platform for implementing the described embodiment.

Depending on the application, a variety of mosaic color photosensors 16A can be used. A popular mosaic color photosensor is a Bayer mosaic color photosensor, as previously described. The mosaic color photosensor is configured to provide a plurality of sequences of images of the dynamically changing scene, where each of the plurality of sequences of images is a distinct predefined color. Similarly, a NIR photosensor 168 provides a sequence of NIR images of the dynamically changing scene.

Photosensors 16A, 16B send image data to a processing system 18, as shown by arrows 22 (straight arrows). Command, control, and related communications are shown by arrows 24 (curved arrows). Processing system 18 includes one or more processors and implements one or more modules, including, but not limited to processing image data, control of the photosensors, and communications. A preferable configuration for processing system 18 includes an exposure control and synchronization module 18A and an image-processing module 18B. Exposure control and synchronization module 18A can handle input/output functions of the photosensors, provide trigger signals for synchronization of image capture, control of exposure times, and other operating parameters. Image processing module 18B handles processing of images and optionally other image related functions.

Image processing module 18B processes a first group of two or more images, each image provided from one of the plurality of sequences of images, to optimize an exposure parameter for the first group. A second group includes one or more images, each from one of the plurality of sequences of images other than the sequences of images providing images for the first group. An exposure parameter is determined by applying at least one exposure criterion to the first group, while disregarding the second group. The exposure parameter is used by the exposure control and synchronization module 18A to set an effective exposure independently for the photosensors 16A, 16B. After independently setting the effective exposure, subsequent images from the first group are used to generate a sequence of multi-spectral images.

One ordinarily skilled in the art will appreciate that the subdivision of processing functions between physical parts of the system may vary widely depending on the application, and that many aspects of the processing system may be implemented as various different combinations of hardware, software, and firmware. By way of example, particularly in the case of CMOS image photosensor arrays, various processing functions may be integrated directly onto the image sensor chips themselves. Thus, the recited processing system refers to the presence of suitable components at any location within the system that perform the particular recited functions further detailed below.

Processing system 18 is typically associated with an output module 20. Additionally, or alternatively, the output module may be directed to another device, such as a communications system for transmission to a remote location, a data storage device, or another processing system for further analysis of the collected data.

U.S. Pat. No. 6,215,597 to Duncan Technologies for Apparatus for forming a plurality of subimages having different characteristics, teaches a basic architecture for a camera that can display either standard color images or multispectral images according to operator choice. Depending on the application, this architecture may be able to be used as a basis for implementing the innovative system of the currently described embodiment.

Figure 3:
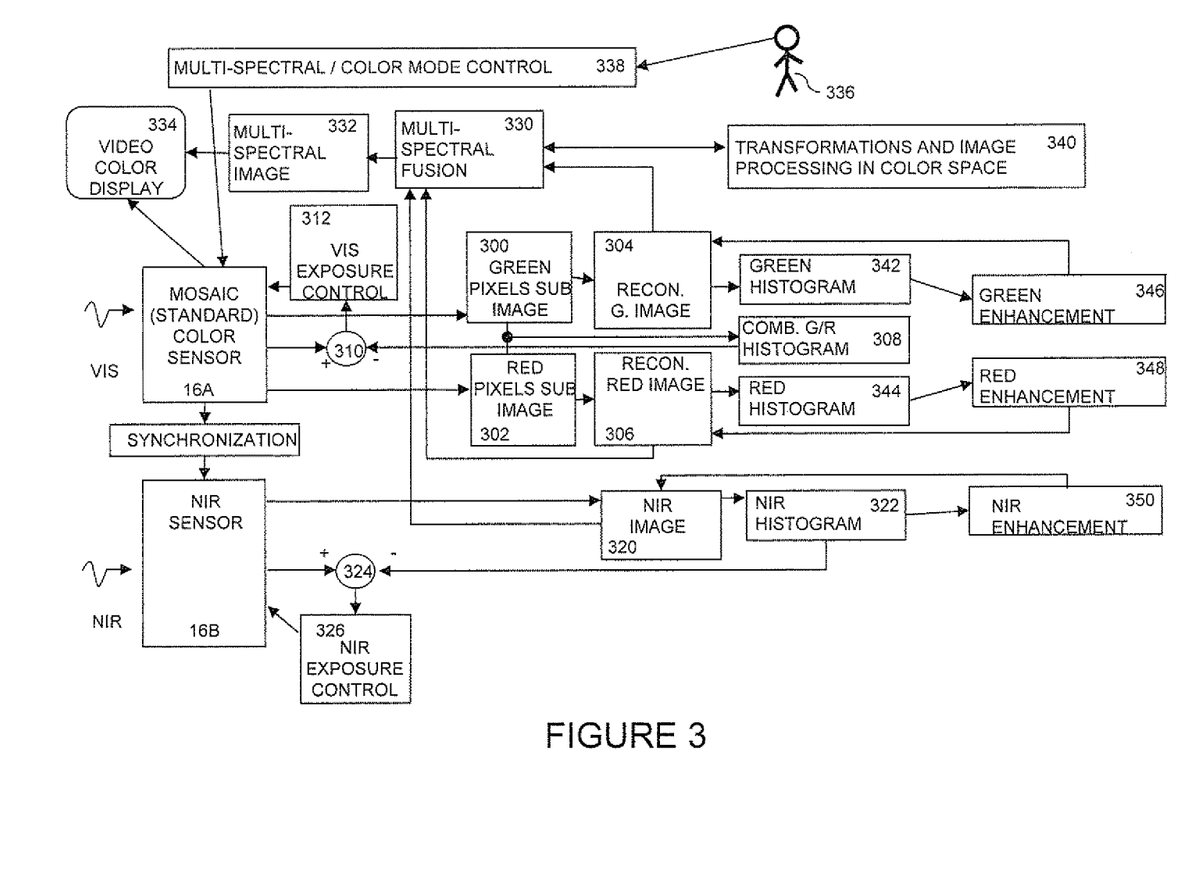
FIG. 3, a flow diagram of a multi-spectral imaging system.

Referring to FIG. 3, a flow diagram of a multi-spectral imaging system, non-limiting examples and preferred embodiments are used to clarify the principles and operation of the present embodiment. FIG. 3 shows additional details of the processing described in reference to FIG. 1. A preferred implementation of mosaic color photosensor 16A is to use a Bayer mosaic color photosensor, which generates three sequences of images: a red sequence of images, a green sequence of images, and a blue sequence of images. In conventional systems, all the images are used with demosaicing algorithms to interpolate a set of complete color values for each pixel. A feature of the current embodiment is that the images are individually derived from different subsets of the mosaic pixels, and independently processed. The mosaic color photosensor 16A is synchronized (SYNCHRONIZATION) to NIR photosensor 16B. A typical implementation of a NIR sensor is using a standard black and white sensor. The image data from the mosaic color photosensor 16A is first provided as a sub-image of the respective color pixels. For example, green pixels sub-image 300 and red pixels sub-image 302. The sub-images are processed to generate reconstructed color images, simply referred to as images, such as reconstructed green image 304 and reconstructed red image 306. Generally, either the sub-image or image can be used for processing. For clarity in this description, alternative processing using sub-images is not described.

In a preferred embodiment, a first group includes images from a sequence of images having the distinct predefined color of green and images from a sequence of images having the distinct predefined color of red. A second group includes images from a sequence of images having the distinct predefined color of blue (not shown in FIG. 3). The green and red images (in this example sub-images 300 and 302) in the first group are combined to generate a green/red histogram 308. The blue images in the second group are disregarded. A parameter derived from the level of the population of the green/red histogram can be used as an exposure criterion for the first group, and the exposure criterion is used to determine an exposure parameter. The exposure parameter is fed back through the system where the exposure parameter is used by visual (VIS) exposure control components 310, 312 to set an effective exposure for the mosaic color photosensor 16A. The system generates an effective exposure for the mosaic color photosensor based on the exposure parameter, the mosaic color photosensor is responsive to the effective exposure, and the mosaic color photosensor is set in accordance with the effective exposure. In the context of this document, the term "effective exposure" refers to any adjustable parameter which determines the exposure time or "integration time" for sampling an image frame by a given image sensor array, or which achieves a result equivalent to varying the exposure time. Techniques for implementing adaptive exposure can be found in patent application WO 2009/093110 Method and Apparatus for Multi-Spectral Imaging to Rafael Advanced Defense Systems LTD, Israel.

A non-limiting example of an exposure criterion is using a pre-defined average percentage of the charge (electrons) filling the capacitor attributed to each pixel at a specified frame. In one case, the exposure criterion is defined as 70% average capacity. The average capacity is calculated over the measured capacities of the pixels that generate an image (typically an image from the NIR detector or sub images from the green and red pixels of the mosaic color photosensor) at a certain frame. If the calculated average capacity is less than the exposure criterion of 70%, the exposure time of the subsequent frame will be adjusted by the system to be larger by an amount proportional to the difference between the exposure criterion (70%) and the calculated average capacity. Similarly, if the calculated average capacity is more than the exposure criterion, the exposure time of the subsequent frame will be reduced by the system, based on the proportion of the difference between the exposure criterion and the calculated average capacity. Charge filling of a pixel can be measured by techniques such as measuring the voltage of a pixel or measured digitally from the black level of the pixel.

Similarly, NIR photosensor 16B provides a sequence of NIR images 320. A NIR histogram 322 can be used to optimize an exposure parameter for the NIR image, which can be fed back through the system where is used by NIR exposure control components 324, 326 to set an effective exposure for the NIR photosensor 16B. The effective exposure for the NIR photosensor 16B is set independently from the effective exposure for the mosaic color photosensor 16A. Techniques for setting exposure control are known in the art, and based on this description one knowledgeable in the art will be able to select and implement appropriate techniques for a specific application.

Where reference is made to adjustments or corrections made "independently" for each spectral channel, this refers to adjustments or corrections that achieve an individually tailored result for each channel as opposed to being identical for all channels. The term "independently" does not necessarily exclude cases where some part of the process is performed commonly for plural channels, or where some degree of correlation is imposed between the channels. Thus, for example, a correction or adjustment may in some cases be performed commonly on all channels, and then selected channels may be subject to an additional individual correction or adjustment, thereby achieving the result of an independent correction or adjustment for all channels.

Subsequent images from the first group of green images 304, red images 306, and NIR images 320 are used to generate 330 a sequence of multi-spectral images 332. In a case where multi-spectral images include colors from a non-visible spectral range, such as NIR, the NIR images are mapped to a visible color and the multi-spectral images are synthetic color images. Optionally, the sequence of multi-spectral images 332 can be output as a video sequence, for example to a video color display 334.

External control 336, for example a human operator, can optionally be used to control 338 the operation of the multi-spectral imaging device. Control includes control of the output of mosaic color photosensor 16A, which can be processed as described above for multi-spectral mode, or outputting image data from the mosaic color photosensor 16A directly to a video color display 334 for standard color mode or true color mode. In this context, standard color mode refers to outputting an RGB image using only the mosaic color sensor, without using a NIR sensor/NIR images. Typically, the multi-spectral mode and the standard color mode are not presented simultaneously. Typically switching between modes can be done via software command, and additional hardware configuration is not necessary. Control also includes, but is not limited to, tuning the image by standard features like brightness level, contrast, and adjusting similar parameters.

The generated 330 multi-spectral images or color images (red, green, NIR) can optionally be processed with known techniques, for example transformations and image processing in color space 340.

An embodiment of an innovative technique for constructing a multi-spectral image of a scene based on individually contrast-enhanced images of the scene uses a plurality of images of a scene, wherein each of the plurality of images is a distinct predefined color. A non-limiting example is using green images 304 and red images 306. One or more green images are processed to derive a contrast enhancement (contrast enhancement parameter or parameters) for the green images. Separately, the red images are processed to derive a contrast enhancement for the red images. The derived contrast enhancement for the green images is applied to the green images to produce contrast-enhanced green images. Similarly and independently, the derived contrast enhancement for the red images is applied to the red images to produce contrast-enhanced red images. The green contrast-enhanced images and the red contrast-enhanced images are used to generate a multi-spectral image. In the context of this document, "deriving a contrast enhancement" generally refers to deriving one or more parameters that can be used for performing contrast enhancement. Although reference may be made to "a parameter" in the singular, it should be interpreted as including the possibility of multiple parameters or values defining the contrast enhancement.

The plurality of images can be provided by an image source, such as a mosaic color photosensor 16A. Similarly, NIR photosensor 16B can provide NIR images 320. A processing system, such as processing system 18, described in reference to FIG. 1, can be used to process the images. One or more of the plurality of images is processed to derive a contrast enhancement for the respective one or more images. One or more of the plurality of images is processed with the respective contrast enhancement, performing contrast enhancement independently on each of the images. An example of processing is using a histogram (green 342, red 344, or NIR 322) with a contrast criterion to determine the necessary contrast enhancement (green 346 red 348, or NIR 350, respectively) to be performed on respective images. Each contrast enhancement is used to process each of the respective images, and then one or more of the contrast-enhanced images is used to generate 330 a multi-spectral image 332. The multi-spectral image can be generated using two or more contrast-enhanced images and/or with one or more of the plurality of images (not contrast-enhanced).

In a case where the image source provides a plurality of sequences of images, this technique for constructing a multi-spectral image can be repeated with each of the plurality of sequences of images to generate a sequence of multi-spectral images.

In the context of this document, the term "contrast enhancement" refers to any image processing technique that enhances the visual perceptibility of small changes between intensity values of pixels. Typically, contrast enhancements adjust pixel intensity values to spread the distribution of pixel values across a wider range of values within the dynamic range of the image. A large range of techniques for contrast enhancement are known in the art, and do not per se constitute part of the present invention. The contrast enhancement techniques may be applied either locally on different regions of the image and then combined to a complete scene, or may be applied globally on the entire image.

In the system of FIG. 3, the contrast enhancement technique feeds back into the system, providing contrast-enhanced green images 304, red images 306, and NIR images 320 to generate 330 a sequence of multi-spectral images, or further processing 340. In this case, the sequence of multi-spectral images is a contrast-enhanced sequence of multi-spectral images.

Figure 4:
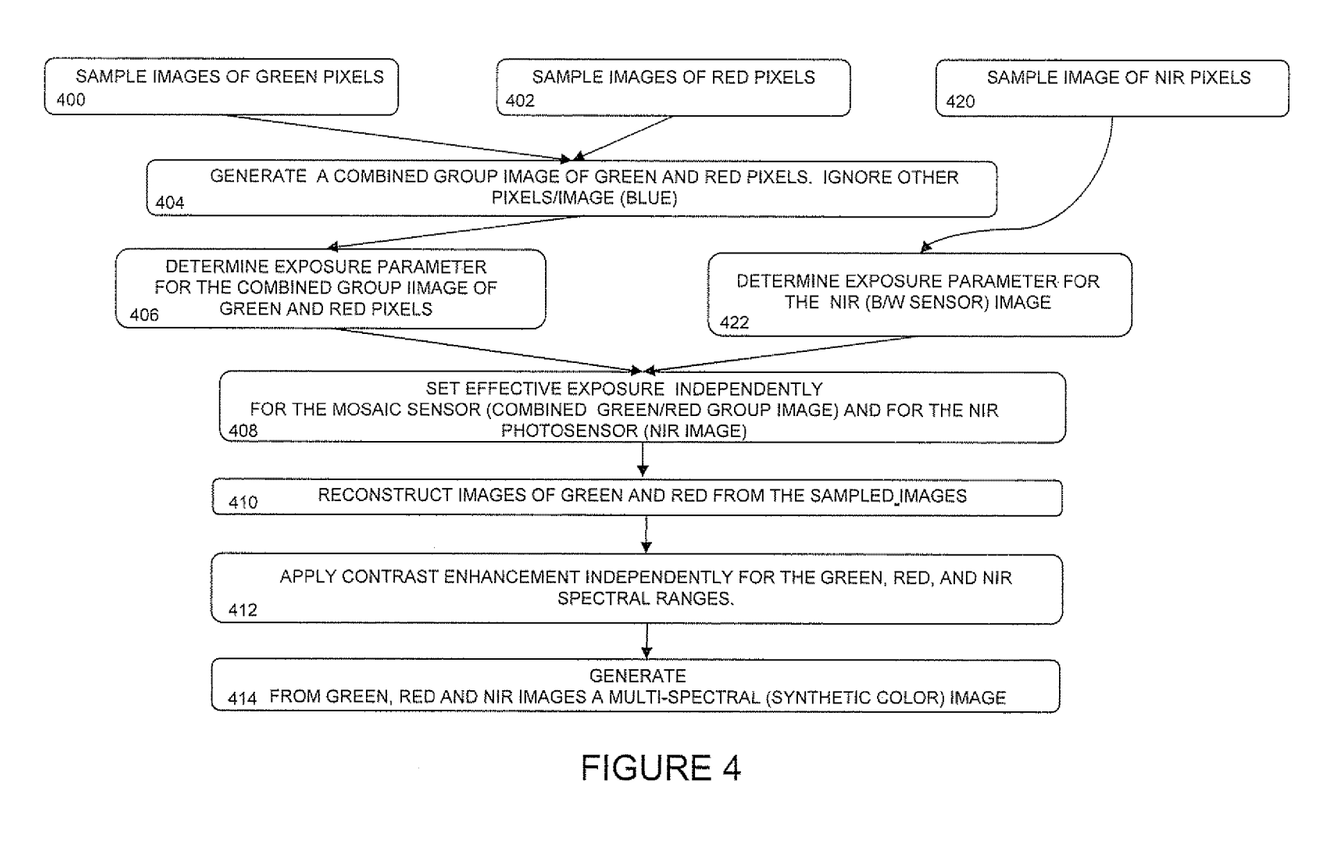
FIG. 4, a flowchart of a method for sampling multi-spectral images of a dynamically changing scene.

Referring to FIG. 4, a flowchart of a method for sampling multi-spectral images of a dynamically changing scene, non-limiting examples and preferred embodiments are used to clarify the principles and operation of the present embodiment. The dynamically changing scene is sampled (400, 402) to provide a plurality of sequences of images of the dynamically changing scene, wherein each of the plurality of sequences of images is a distinct predefined color. In a preferred implementation, the dynamically changing scene is sampled with a multi-spectral imaging device configured with a mosaic color photosensor, the mosaic color photosensor providing the plurality of sequences of images. Each of the plurality of sequences of images is derived from different subsets of the mosaic pixels. In one implementation, the mosaic color photosensor is a Bayer mosaic color photosensor. In a non-limiting example, sampling includes images from a sequence of images having the distinct predefined color of green 400 and images from a sequence of images having the distinct predefined color of red 402. Generally, either a sub-image or an image can be used. For clarity in this description, alternative processing using sub-images is not described.

Optionally, a first group of two or more images, each provided from one of the plurality of sequences of images the images from the first group are combined to generate 404 a combined group image, while disregarding a second group (not shown in FIG. 4) of one or more images each from one of the plurality of sequences of images other than the sequences of images providing images for the first group. The first group is processed to optimize 406 an exposure parameter for the first group, the exposure parameter determined by applying at least one exposure criterion to the first group while disregarding the second group. In the current example, a first group of green 400 and red 402 images are used, while disregarding a second group of blue images (not shown). Optionally, the exposure parameter is determined from exactly one image from each of one or more of the plurality of sequences of images in the first group. Optionally, the exposure parameter is determined from a plurality of images from each of one or more of the plurality of sequences of images in the first group.

A feature of the current embodiment is applying independent image enhancement on subsets of pixels that have different characteristics (for example, different responses to different colors). This feature extracts more detail from a scene through enhancement in color space, as compared to conventional techniques. In enhancing each color independently, the contrast of each color in a scene is optimized. Fusing each color in a scene results in a more vivid multi-colored scene.

An effective exposure is set 408 in accordance with the exposure parameter. In a case where a mosaic color photosensor is being used, the effective exposure for the mosaic color photosensor is set in accordance with the exposure parameter.

Subsequent images from the first group are used to generate 414 a corresponding sequence of multi-spectral images.

Other sequences of images can also be sampled 420 and provided to be used to generate the sequence of multi-spectral images. Sampling of the dynamically changing scene preferably includes sampling 420 a sequence of near infrared (NIR) images. In one implementation, the NIR images are provided by a NIR photosensor. A NIR image from the sequence of NIR images is processed to optimize 422 an exposure parameter for the NIR image and an effective exposure is set 408 for the NIR photosensor in accordance with the exposure parameter for the NIR image. Techniques for determining exposure parameters are described above. Sequences of multi-spectral images are generated with corresponding subsequent NIR images.

Optionally and preferably, reconstructed images are reconstructed 410 from sampled images from the first group. In the current example, green and red sampled images are used to reconstruct 410 a combined green/red image.

Optionally, contrast enhancement 412 is performed independently on images from each of one or more of the plurality of sequences of images in the first group. The contrast-enhanced images can be used to generate a corresponding sequence of multi-spectral images.

An embodiment of an innovative technique for generating a multi-spectral image of a scene based on individually contrast-enhanced images of the scene uses a plurality of images of a scene, wherein each of the plurality of images is a distinct predefined color. A respective contrast enhancement is derived from each of one or more of the plurality of images. One or more of the plurality of images is processed with the respective contrast enhancement to generate contrast-enhanced images. A multi-spectral image is generated based on one or more contrast-enhanced images.

Optionally, the plurality of images is generated from a mosaic color photosensor. Optionally, a multi-spectral image is generated based on two or more contrast-enhanced images. Optionally, a multi-spectral image is generated based on one or more contrast-enhanced images with one or more of the plurality of images.

Optionally, a plurality of sequences of images is generated, and processing is repeated on each of the plurality of sequences of images to generate a sequence of multi-spectral images.

Although the above description relates to a preferred implementation of the present embodiment in the context of video photography, note that the principles of the present embodiment may also be applied in other contexts. For example, in a case of a high quality true color stills camera with separate sensor arrays for each color channel, the separate channel exposure control of the present embodiment can be used to produce photographs with truer color than conventional techniques. In this case, the exposure setting for each channel would preferably be derived from readings taken during pre-shot monitoring mode, or from a test-exposure taken just prior to the main image exposure. In such a case, a color balance correction may also be required.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

It will be appreciated that the above descriptions are intended only to serve as examples, and that many other embodiments are possible within the scope of the present invention as defined in the appended claims.

What is claimed is:

1. A method for sampling multi-spectral images of a dynamically changing scene, the method comprising the steps of:
    (a) deriving by use of a mosaic color photosensor a plurality of color separation sequences of images of the dynamically changing scene, wherein each of said plurality of color-separation sequences of images contains color-separation images corresponding to a distinct predefined color;

(b) defining a subset of said color-separation sequences, said subset excluding at least one of said color separation sequences;

(c) deriving a group of one or more of said color-separation images from said subset;

(d) determining an exposure parameter by applying at least one exposure criterion to said group;

such that said exposure parameter is determined based on said subset excluding at least one of said color separation sequences; and (e) adjusting said mosaic color photosensor to sample an image using an effective exposure setting, said effective exposure setting for said mosaic color photosensor being set in accordance with said exposure parameter.

2. The method of claim 1 wherein said subset of color-separation sequences contain color-separation images corresponding to green and red, and wherein said color-separation sequence not included in said subset of color-separation sequences contains color-separation images corresponding to blue.

3. The method of claim 1 wherein respective contrast enhancement parameters are derived from each of one or more of said plurality of color-separation sequences of images in said subset of color-separation sequences, and one or more of said plurality of color-separation sequences of images is independently processed with said respective contrast enhancement parameters.

4. The method of claim 3 wherein the contrast-enhanced images are used to generate a corresponding sequence of multi-spectral images.

5. The method of claim 1 wherein said exposure parameter is determined from exactly one color-separation image from each of said color-separation sequences of said subset of color-separation sequences.

6. The method of claim 1 wherein said exposure parameter is determined from a plurality of color-separation images from each of said color-separation sequences of said subset of color-separation sequences.

7. A system for sampling multi-spectral images of a dynamically changing scene comprising:

(a) a mosaic color photosensor configured to provide a plurality of color-separation sequences of images of the dynamically changing scene, wherein each of said plurality of color-separation sequences of images contains color-separation images corresponding to a distinct predefined color; and (b) an optical arrangement for transferring light of the dynamically changing scene to said mosaic color photosensor; and (c) a processing system including one or more processors configured to (i) define a subset of said color-separation sequences, said subset excluding at least one of said color separation sequences;

(ii) derive a group of one or more of said color-separation images from said subset;

(iii) determine an exposure parameter by applying at least one exposure criterion to said group;

such that said exposure parameter is determined based on said subset excluding at least one of said color separation sequences; and (iv) adjust said mosaic color photosensor to sample an image using an effective exposure setting, said effective exposure setting for based on said exposure parameter.

8. The system of claim 7 wherein said mosaic color photosensor is a Bayer mosaic color photosensor.

9. The system of claim 7 further including a near infrared (NIR) photosensor providing a sequence of NIR images of the dynamically changing scene.

10. The system of claim 9 wherein said optical arrangement includes a system of dichroic filters configured to split said light of the dynamically changing scene into NIR light and visible light, and configured to provide said NIR light to said NIR photosensor and provide said visible light to said mosaic color photosensor.

11. The system of claim 9 wherein said optical arrangement includes a system of one or more prisms configured to split said light of the dynamically changing scene into NIR light and visible light, and configured to provide said NIR light to sad NIR photosensor and provide said visible light to said mosaic color photosensor.

12. The system of claim 9 wherein said processing system processes a NIR image from said sequence of NIR images to optimize an exposure parameter for said NIR image and an effective exposure for said NIR photosensor is set in accordance with said exposure parameter for said NIR image.

13. The system of claim 9 wherein said processing system generates a corresponding sequence of multi-spectral images from a combination of subsequent color-separation images from said subset of color-separation sequences and corresponding subsequent NIR images.

14. The system of claim 7 wherein said processing system generates multi-spectral images and alternatively generates true color mode images.

15. The method of claim 1 further including the step of:
generating a corresponding sequence of multi-spectral images employing subsequent images from said subset of said color-separation sequences.

16. The system of claim 7 wherein said processing system is further configured to:
generate a corresponding sequence of multi-spectral images employing subsequent images from said subset of said color-separation sequences.

17. The system of claim 7 wherein said mosaic color photosensor is further configured to provide said subset of color-separation sequences containing color-separation images corresponding to green and red, and wherein said color-separation sequence not included in said subset of color-separation images containing color-separation images corresponding to blue.

18. The system of claim 7 wherein said processing system derives respective contrast enhancement parameters from each of one or more of said plurality of color-separation sequences of images in said subset of color-separation sequences, and one or more of said plurality of color-separation sequences of images is independently processed with said respective contrast enhancement parameters to generate contrast-enhanced images.

19. The method of claim 1 wherein said step of adjusting includes
setting an effective exposure for said mosaic color photosensor.

20. The system of claim 7 wherein
said mosaic color photosensor responsive to said effective exposure, said mosaic color photosensor being set in accordance with said effective exposure.

* * * * *